United States Patent
Parameshwaran et al.

(10) Patent No.: US 11,823,144 B2
(45) Date of Patent: Nov. 21, 2023

(54) HANDLING AN ONLINE GROUP PAYMENT

(71) Applicant: INTERNATIONAL BUSINESS MACHINES CORPORATION, Armonk, NY (US)

(72) Inventors: Pradeep Parameshwaran, Boeblingen (DE); Wenjia Zhang, Boeblingen (DE); Wilhelm Mild, Boeblingen (DE); Andreas Nauerz, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/288,994

(22) Filed: Feb. 28, 2019

(65) Prior Publication Data
US 2020/0279234 A1 Sep. 3, 2020

(51) Int. Cl.
*G06Q 20/12* (2012.01)
*G06Q 20/08* (2012.01)
*G06Q 20/40* (2012.01)

(52) U.S. Cl.
CPC ......... *G06Q 20/0855* (2013.01); *G06Q 20/12* (2013.01); *G06Q 20/407* (2013.01)

(58) Field of Classification Search
CPC .. G06Q 20/0855; G06Q 40/12; G06Q 20/407; G06Q 20/12
See application file for complete search history.

(56) References Cited

U.S. PATENT DOCUMENTS

| | | | |
|---|---|---|---|
| 9,773,237 B2 * | 9/2017 | Ananda kumar | G06Q 20/14 |
| 2012/0150728 A1 * | 6/2012 | Isaacson | G06Q 20/28 |
| | | | 705/39 |
| 2013/0041824 A1 | 2/2013 | Gupta | |
| 2016/0012405 A1 | 1/2016 | Lynch | |
| 2017/0004468 A1 | 1/2017 | Stroeh et al. | |

(Continued)

FOREIGN PATENT DOCUMENTS

EP 3062271 A1 * 8/2016 ............. G06F 3/041

OTHER PUBLICATIONS

Scheir, Anonymous Split E-Cash-Toward Mobile Anonymous Payments, ACM Transactions on Embedded Computing Systems, 2015, vol. 14 (4), p. 1-25, Article 85.*

(Continued)

*Primary Examiner* — Ilse I Immanuel
(74) *Attorney, Agent, or Firm* — Rakesh Roy

(57) ABSTRACT

A method, computer system, and a computer program product for an online group payment is provided. The present invention may include registering a first party using a virtual account service and initiating a joint deal with a merchant. The present invention may include publishing the joint deal. The present invention may include subscribing a second party to the joint deal. The present invention may include invoking a transfer of an approved fund from a second party account to a virtual account service account. The present invention may include in response to meeting a first threshold, executing the joint deal, wherein the executed joint deal includes, executing a merchant payment associated with the joint deal. The present invention may include in response to a cancelation of the joint deal, automatically rescinding the payment authorization from the second party.

16 Claims, 6 Drawing Sheets

(56) References Cited

U.S. PATENT DOCUMENTS

2018/0336554 A1* 11/2018 Trotter ................... G06F 21/62
2020/0013037 A1* 1/2020 Benkreira .............. G06Q 20/29

OTHER PUBLICATIONS

Anonymous, "Multi-Point Near Field Communication Payments by Mobile Device," An IP.com Prior Art Database Technical Disclosure, Feb. 13, 2013, p. 1-2, IP.com No. IPCOM000225396D.

Gray, "NEM Apostille—Blockchain Notarizations that are Transferable, Updatable, Branded, and Conjointly Owned," NEM Forum, Nov. 2016, p. 1-5, https://forum.nem.io/t/nem-apostille-blockchain-notarizations-that-are-transferable-updatable-branded-and-conjointly-owned/2974, Accessed on Feb. 27, 2019.

Groupon, "Purchase Options Explained," Groupon Getaways, p. 1, https://www.groupon.com/pages/getaways-package-deals-explained, Accessed on Feb. 27, 2019.

Horwitz, "Wallet Wars: A Visual Peek Inside China's PayPal," Tech in Asia, Jan. 17, 2014, p. 1-10, https://www.techinasia.com/alipay-wallet, Accessed on Feb. 27, 2019.

IBM, "A Method for Implementing 'Split Bill' E-Paymant," An IP.com Prior Art Database Technical Disclosure, May 30, 2006, p. 1-2, IP.com No. IPCOM000136722D.

Irby, "7 Best Bill-Splitting Apps of 2019," The Balance, Updated Feb. 27, 2019, p. 1-6, https://www.thebalance.com/best-bill-splitting-apps-4170968, Accessed on Feb. 27, 2019.

Mell et al., "The NIST Definition of Cloud Computing," National Institute of Standards and Technology, Sep. 2011, p. 1-3, Special Publication 800-145.

Paypal, "Split Payments," PayPal Community, Oct. 14, 2013, p. 1-3, https://www.paypal-community.com/t5/My-Feedback-for-PayPal-Archive/Split-payments/td-p/704977, Accessed on Feb. 27, 2019.

* cited by examiner

HANDLING AN ONLINE GROUP PAYMENT

BACKGROUND

The present invention relates generally to the field of computing, and more particularly to the field of payment systems.

Many purchases may be conducted by a group. Each party in the group may need to provide the funds necessary to execute the group purchase.

SUMMARY

Embodiments of the present invention disclose a method, computer system, and a computer program product for an online group payment. The present invention may include registering a first party using a virtual account service and initiating a joint deal with a merchant. The present invention may include publishing the joint deal. The present invention may include subscribing a second party to the joint deal. The present invention may include invoking a transfer of an approved fund from a second party bank account to a virtual account service bank account. The present invention may include in response to meeting a first threshold, executing the joint deal, wherein the executed joint deal includes, executing a merchant payment associated with the joint deal. The present invention may include in response to a cancelation of the joint deal, automatically rescinding the payment authorization from the second party.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
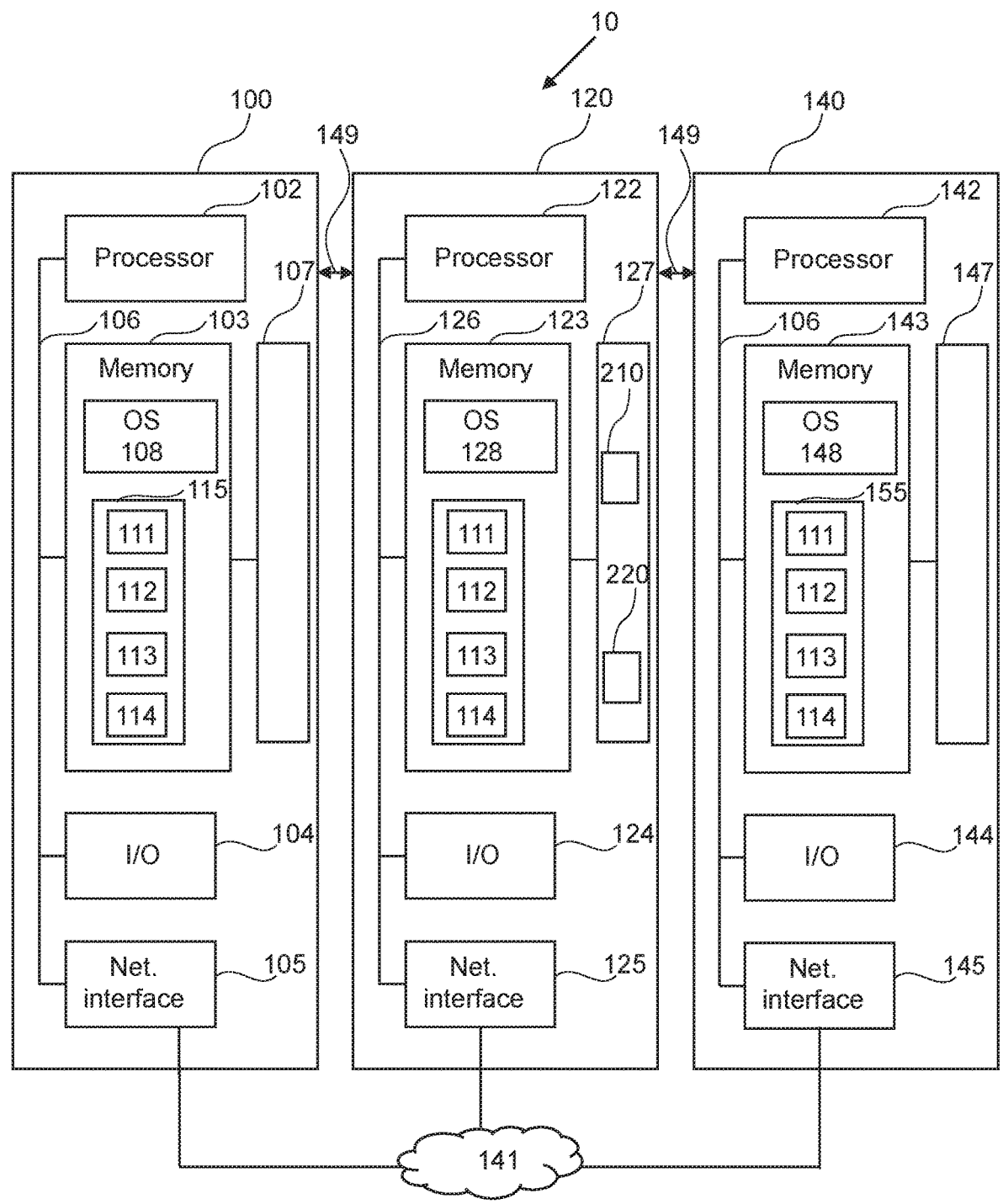
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for preventing a risk that a first party that sets up a joint deal, pays a total price of the joint deal. An application programming interface (API) of a payment service may send a subscription message with an information about a payment authorization. The information about the payment authorization may provide high security corresponding to the fact that an approved amount of funds will be transferred from a bank account of a second party to a bank account of a virtual account service. Accordingly, the approved amount of funds may be regarded as available for payments made on behalf of the group and therefore the first party may not run into the risk of paying the total price for the joint deal.

A typical problem during a purchase of goods as a group of people is that a party of the group invoking the purchase has to wait for the remaining parties of the group to pay their shares of the purchase. The waiting for that causes a delay and also an uncertainty in the whole process of the purchase. In addition to that, the party who invoked the purchase needs to remind the remaining parties to settle their financial differences.

Assuming that a group includes a first and a second party, a maximum amount paid by the first party might be equal to a difference between the total price and the approved amount of funds. In addition to that, the present method may reduce communication among the parties of the group regarding what each party owes to the other party. This is due to the fact, that the amount of funds may be approved by the second party.

The term "joint deal" as used herein may refer to a deal that may be executed on behalf of a group of at least two parties, e.g., the first and the second party. The deal may be a purchase of any good, service, e.g., a leisure event, a beach volley net or even a company share at the stock market. The term "purchase" as used herein may include a reservation of the joint deal, wherein the reservation may include a binding agreement to pay. The term "subscribing a party" as used herein may refer to one or more actions comprising at least a storing of information which provides that the party, e.g., the second party, has given a valid payment authorization, e.g., the payment authorization. After the storing of this information "this party is subscribed". For example, the action may comprise storing of the subscription message together with a name of the party. In the following, the term "the payment authorization" may refer to the payment authorization given by the second party.

According to one embodiment, the execution of the joint deal including its payment to the merchant may be performed automatically if a first threshold is reached. The term "automatically" as used herein refers to an implementation of the present method comprising at least an initiating command which invokes the execution of the joint deal if the first threshold is reached. In this case there is no further input required by the first or second party. Executing the joint deal automatically may result in a quick execution of the joint deal. This is advantageous if the present method is applied in volatile markets where prices change quickly.

According to one embodiment, the execution of the joint deal including its payment to the merchant may be enabled by a user interface of the virtual account service if the first threshold is reached and the first or the second party initiates the execution by using the user interface. This may be advantageous in case the first threshold is a minimum number of parties subscribed to the joint deal. In one embodiment, the first or second party may have the possibility to wait to initiate the execution until more parties than the minimum number of parties have subscribed. That may result in a lower individual price for the joint deal. The user interface may enable the execution by activating a release button of the user interface.

According to one embodiment, the first threshold may include a minimum number of parties subscribed to the joint deal. In this embodiment the execution of the joint deal may only enabled if an actual number of parties subscribed to the joint deal is equal or greater than the first threshold. The enabling of the execution may be realized by calling the initiating command or by activating the release button. With this embodiment it may be possible that the individual price for the joint deal may be lower than an individual price of an individual deal consisting of the same features as the joint deal. Furthermore, it may enable the parties to realize a type of joint deal which may only be available for a group of people consisting of at least the minimum number of parties. This advantage may be independent of the lower individual price of the joint deal.

According to one embodiment, the first threshold may include a maximum individual price of the joint deal. This may enable the possibility to execute the joint deal easier and without communication among the subscribed parties in case the total price of the joint deal changes over time.

According to one embodiment, the joint deal may include a second threshold where the first threshold may include a minimum number of parties subscribed to the joint deal and the second threshold may include a maximum individual price of the joint deal. In this embodiment the joint deal may be executed if the first threshold and the second threshold are reached. This embodiment may combine the advantages of the embodiment, wherein the first threshold may include the minimum number of parties subscribed, and the embodiment, where the first threshold may include the maximum individual price. The phrase "threshold is reached" as used herein may refer to a reaching from below the first threshold if the first threshold is the minimum number of parties; e.g., the actual number of subscribed parties may reach the first threshold from below the first threshold. The phrase "threshold is reached" as used herein may also refer to a reaching from above if the first or the second threshold is the maximum individual price; e.g., the individual price of the joint deal may reach the first or second threshold from above the first and second threshold, respectively. If the individual price of the joint deal is below the maximum individual price at the moment of subscribing to the joint deal, then the second threshold may be reached immediately.

According to one embodiment, the approved amount of fund from the second party's bank account to the bank account of the virtual account service via the data connection may be transferred before the joint deal is executed. As a result, a risk of a deficit of the second party may be reduced. Hence, a probability of executing the joint deal by initiating the payment to the merchant may be enhanced.

According to one embodiment, several payment authorizations given by several subscribed parties, including the first and the second party, are converted simultaneously. This may be advantageous if the payment authorizations expire at different points in time. For example, it may be difficult if the payment authorization given by the second party is valid and three further payment authorizations given by three further subscribed parties are invalid at a point in time when the first threshold is reached. The term "convert a payment authorization given by a party" as used herein refers to an action which provokes that an approved amount of funds according to the payment authorization given by "that party" is transferred from a bank account of "that party" to the bank account of the virtual account service. The phrase "convert several payment authorizations simultaneously" as used herein refers to a conversion of the several payment authorizations within a short time span. The time span may be in the order of a few minutes, and preferable in the order of a few seconds.

The further payment authorizations might have been valid at a point in time the three further parties subscribed, but the further payment authorizations may expire at a certain point in time. However, the approved amount of funds may have already been transferred from the second party's bank account to the bank account of the virtual account service and will then need to be retransferred, if the virtual account service does not convert the several payment authorizations simultaneously. The need to perform this kind of retransfer may be circumvented by converting the payment authorizations simultaneously.

According to one embodiment, registering the first party, subscribing the second party to the joint deal, controlling if the first threshold is reached and/or the execution of the joint deal including its payment to the merchant are functions of the virtual account service. The virtual account service may perform these functions by using at least one program. The virtual account service may store the program in a function memory which may be located outside a server of the virtual account service. The phrase "located outside the server" may include that the function memory is located outside a server casing. For example, the function memory may be stored on a supplementary server. In another example the function memory may be located in a mobile device of the first and/or the second party. This embodiment may reduce a required memory and/or storage capacity of the server. The function memory may be any kind of storage device, such as a hard disk or a RAM, in which one or more executable programs for performing the functions may be stored.

According to one embodiment, the virtual account service may perform the functions by using several programs each of them being suited for performing one of the functions and the virtual account service may store the programs in the function memory which may be located outside the server of the virtual account service. This embodiment may accelerate a performance of the virtual account service in case only a single function is performed by the virtual account service within a large time span. In this case the server may only load one single program of the several programs from the function memory to the memory of the server instead of an accumulative program containing more than one of the functions. The large time span, for example, may be considered to last at least five minutes.

According to one embodiment, the virtual account service may store details of an action of the virtual account service in an encrypted database. For example, the action may be subscribing the second party to the joint deal. In this case the details of the action may comprise a name of the second party and a value of the approved amount of funds. Storing the details may help to keep track of the action. Furthermore, the database may serve as a proof that the payment authorization had been given by the second party once. The encrypted database may allow that the details may not be accessible to parties who do not have access to a key for decrypting the encrypted database.

According to one embodiment, a user device of the first or second party connectable to the virtual account service may store the details of the action. If the storing of the details of the action is decentralized by storing it on a storage of the user device, the required storage capacity of the server may be reduced.

According to one embodiment, the virtual account service may store the details of the action on a first storage of a first user device of the first party and on a second storage of a second user device of the second party. This embodiment may enable a decentralized storing approach of the details of the action. Furthermore, by storing the details of the action on two different memories at least one backup copy of the details of the action may be created. This may enhance the safety of the virtual account service, especially if the first or the second user device gets lost. Preferably, the virtual account service may compare storage contents of the first and the second storage frequently in order to discover if the virtual account service is in a compromised state. This may further enhance the safety of the virtual account service.

According to one embodiment, the virtual account service may store details of all actions on the first and the second storage which are performed by the virtual account service within a time span starting from an instant of time when the joint deal is set up and ending at an actual instant of time. This embodiment may help to analyze a process of performing the joint deal as a whole. By analyzing the process, the process knowledge may be obtained to optimize the process.

According to one embodiment, the method may further comprise encryption of the details of all the actions by the virtual account service. The encrypting and the storing of the details of all actions on the first and the second storage may create storage contents of the first and second storage containing these details and may provide safety from cyber-attacks at the same time.

According to one embodiment, the joint deal may be canceled if the payment authorization is invalid. In this case the joint deal may be set up again with those parties getting subscribed again to the joint deal by the server whose payment authorizations are valid, hereinafter referred to as trusted parties. The virtual account service may disable the second party from getting re-subscribed to the joint deal. Resetting up the joint deal may provoke that the trusted parties altogether may get re-subscribed by the server within a shorter time span than previous subscriptions. As a result, the payment authorizations given by the trusted parties may be valid approximately in an equal period of time differing approximately only in a length of said shorter time span. This embodiment may increase the probability that the virtual account service may be able to convert the payment authorizations of the trusted parties simultaneously. Though a synergetic effect may be realized which may increase a credibility of the method.

According to one embodiment, the present method may provide a possibility to get subscribed to the joint deal if the payment authorization is invalid. This may accelerate the execution of the joint deal, because the joint deal may not be canceled and by that the trusted parties may not need to be re-subscribed by the server.

According to one embodiment, the joint deal may be executed if the first threshold is reached and a further condition is fulfilled. The further condition may be set up by the second party. The second party may set up the further condition during the registration or subscription of the second party. This embodiment may enhance the flexibility of the virtual account service. Some potential parties may only be willing to pay for the joint deal if the further condition is fulfilled.

According to one embodiment, the further condition is fulfilled if a sum of the individual price of the joint deal and a further maximum individual price of a further deal or further joint deal the second party is subscribed to is below or equal to a total individual price. Preferably, the virtual account service may read in the total individual price and the further maximum individual price as input data given by the second party. Formulating the further condition in this way may reduce a financial risk for the second party to spend more than the total individual price on subscribed deals. At the same time this may enhance the probability of executing the joint deal in case the further deal has a further individual price which is below the further maximum individual price.

Referring to FIG. 1, an exemplary computer system 10 for handling an online group payment in accordance with one embodiment is depicted. The computer system 10 may be suited for implementing method steps as involved in the disclosure. The computer system 10 comprises at least a first computer system 100, a second computer system 120 and a third computer system 140.

First computer system 100 may include processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM)). Note that the memory 103 can have a distributed architecture, where various components are situated remote from one another, but can be accessed by the processor 102.

Memory 103 in combination with a persistent storage device 107 may be used for local data and instruction storage. The storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs, each of which comprises an ordered listing of executable instructions for implementing logical functions, notably functions involved in examples. The software in memory 103 shall also typically include a suitable operating system (OS) 108. The OS 108 essentially controls the execution of other computer programs for implementing at least part of methods as described herein.

Second computer system 120 may include processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM)). Note that the memory 123 can have a distributed architecture, where various components are situated remote from one another, but can be accessed by the processor 122.

Memory 123 in combination with a persistent storage device 127 may be used for local data and instruction storage. The storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs, each of which comprises an ordered listing of executable instructions for implementing logical functions, notably functions involved in examples. The software in memory 123 shall also typically include a suitable operating system (OS) 128. The OS 128 essentially controls the execution of other computer programs for implementing at least part of methods as described herein.

Third computer system 140 may include processor 142, memory 143, I/O circuitry 144 and network interface 145 coupled together by bus 146.

Processor 142 may represent one or more processors (e.g., microprocessors). The memory 143 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM)). Note that the memory 143 can have a distributed architecture, where various components are situated remote from one another, but can be accessed by the processor 142.

Memory 143 in combination with a persistent storage device 147 may be used for local data and instruction storage. The storage device 147 includes one or more persistent storage devices and media controlled by I/O circuitry 144. Storage device 147 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 143 may include one or more separate programs, each of which comprises an ordered listing of executable instructions for implementing logical functions, notably functions involved in examples. The software in memory 143 shall also typically include a suitable operating system (OS) 148. The OS 148 essentially controls the execution of other computer programs for implementing at least part of methods as described herein.

The first computer system 100, the second computer system 120 and the third computer system 140 may be independent computer hardware platforms communicating through a high-speed connection 149 or a network 141 via network interfaces 105, 125, 145. The first computer system 100 and the third computer system 140 may be a mobile device, such as a smartphone or a tablet computer, or a stationary device, such as personal computer, whereas the second computer system 120 may be preferably a server-class hardware. The network 141 may, for example, comprise a local area network (LAN), a general wide area network (WAN), and/or a public network (e.g., the Internet). Every computer system 100, 120 and 140 may be responsible for managing its own copies of the data.

The computer system 10 may be configured for functions such as registering a party or further parties who like to take part in a joint deal comprising at least a first threshold, subscribing the party and the further parties to the joint deal, controlling if the first threshold may be reached and executing the joint deal including its payment to a merchant, hereinafter referred to as the first, second, third and fourth function, respectively. The first function may include all instructions required for the setting up the joint deal.

The term "party" as used herein refers to a natural or legal person or an entity acting on behalf of such a person. For example, a robot authorized by the party may act on behalf of the party parties.

The term "virtual account service" as used herein may refer to a computer system suited for implementing method steps as involved in the disclosure. The term "virtual account service" as used herein may also refer to a service suited for performing method steps as involved in the disclosure. The former may be the computer system 10, which comprises the connection 149 and/or the network 141, and may be able to perform the first, second, third and fourth function. The latter may be the first, second, third and fourth function regarded as one unit. The virtual account service may be used via a mobile device and may be in this case regarded as a mobile application.

The virtual account service may perform the first, second, third and fourth function by using a single program or a first program 111, second program 112, third program 113 and fourth program 114, respectively.

The term "program" as used herein refers to a set of instructions which contains commands to provoke actions performed by the processors 102, 122, 142 when the processors 102, 122, 142 are reading the commands. The set of instructions may be in the form of a routine, a subroutine or a part of a library, which can be called by a further program. The set of instructions may have any of the formats the computer readable program instructions mentioned below may have. Preferably the programs 111, 112, 113, 114 may be executable programs which are compiled according to a type of hardware platform of the computer systems 100, 120, 140, respectively.

The memory 103 may comprise a space for storing the single program or the first, second, third and fourth program 111, 112, 113, 114 together; the space hereinafter referred to as first function memory 115. Similarly, the memory 143 may comprise a second function memory 155 containing the programs 111, 112, 113, 114.

Figure 2:
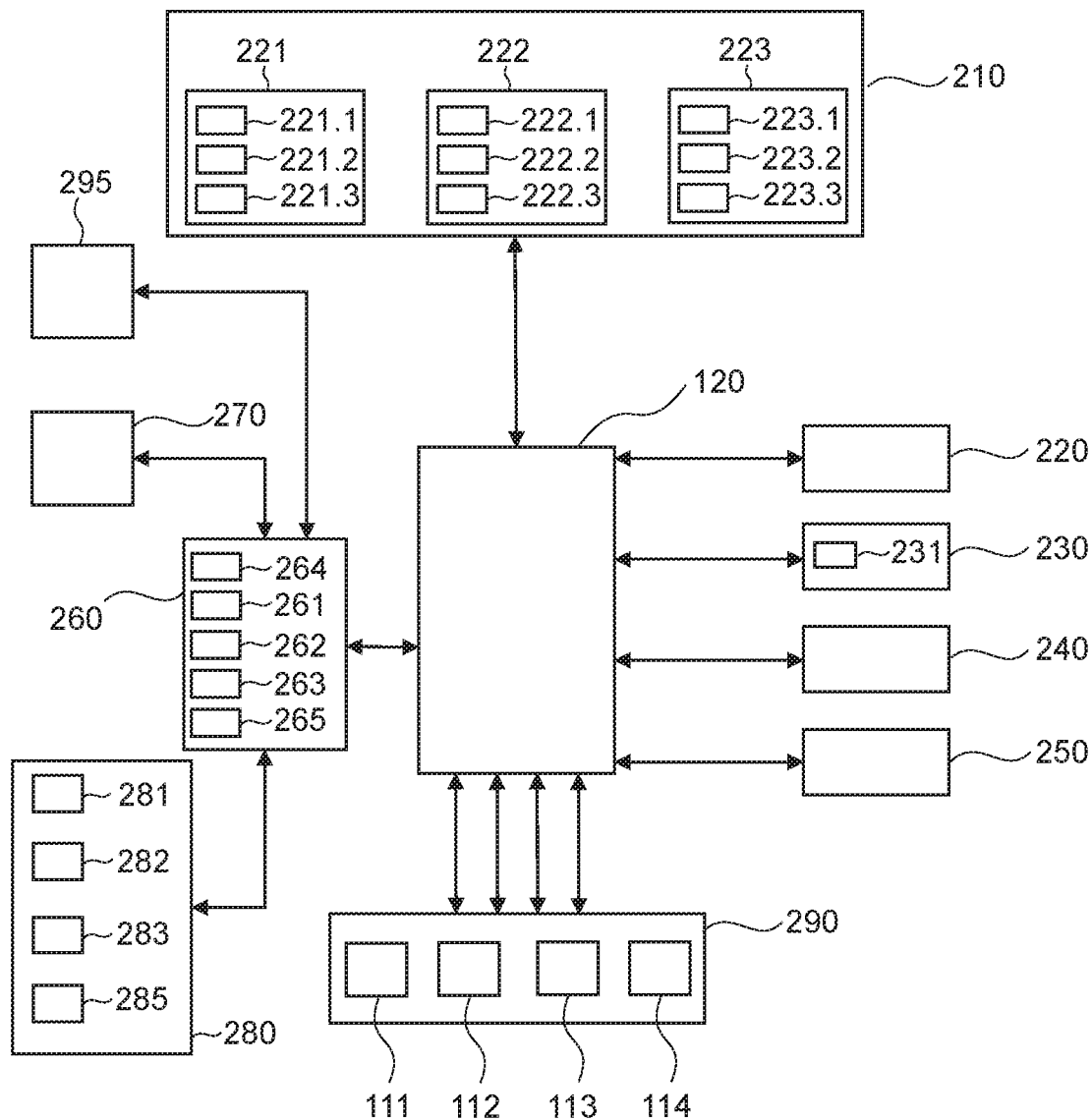
FIG. 2 is a block diagram of components of the computer system depicted in FIG. 1 according to at least one embodiment.

Referring now to FIG. 2, a block diagram illustrating the second computer system 120, hereinafter, without limitation, referred to as server 120, and further entities of the virtual account service according to at least one embodiment is depicted.

The virtual account service may further comprise an event database 210, a digital archive 220, a cancelation engine 240, a payment gateway 250, an application programming interface gateway 260 (API-gateway) and at least one front end 280. In one embodiment, the first and the third computer system 100, 140, used by a first party and a second party, respectively, and further computer systems used by the further parties, may each comprise a front end similar to the front end 280.

The virtual account service may be connectable to a merchant selling system 230 and a bank account interface 270 of a personal bank of the second party and further bank account interfaces 295 of several further bank accounts of the first party and the further parties, respectively.

The event database 210 may contain different event categories. The database 210 may be structured such that to each event category there are assigned several different events comprising several actions and a possible maximum number of participants who can take part at each event. In one embodiment, the event categories may include, for example, skiing events, theatre events, and museum events. The digital archive 220 may contain files 221, 222, 223 each comprising information about past events which were set up, executed and/or canceled. The information may also include a purchase history for each event which was set up in the past.

The term "setting up an event" as used herein may refer to any actions the first party undertakes to specify the joint deal. These actions may comprise selecting the joint deal from listed events 221.1, 221.2, 221.3, 222.1, 222.2, 222.3, 223.1, 223.2, 223.3 in the event categories and may also comprise selecting a minimum number of parties being subscribed to the joint deal so that the joint deal may be executed. A maximum individual price may also be specified by the first party in order to specify the joint deal.

The server 120 may communicate with the merchant selling system 230 directly or via a merchant application programming interface (merchant-API). For example, the server 120 may actualize the actions and prices of the actions of the events 221.1, 221.2, 221.3, 222.1, 222.2, 222.3, 223.1, 223.2, 223.3 regularly, e.g., at least once a day. The merchant selling system 230 may comprise an actualization module 231 which sends regularly, e.g., at least once a day, updated information about the events 221.1, 221.2, 221.3, 222.1, 222.2, 222.3, 223.1, 223.2, 223.3, such as updated prices and actions.

The term "module" as used herein may refer to any hardware, software, artificial intelligence, fuzzy-logic, or a combination thereof for performing a function associated with the "module".

The cancelation engine 240 may perform a process of cancelation of the joint deal including rescinding a given payment authorization by the second party, the first party and/or the further parties.

The server 120 may load the programs 111, 112, 113, 114 from the first or second function memory 115, 155 into the memory 123 of the server 120 if necessary. Alternatively, or in addition to that, the server 120 may load the programs 111, 112, 113, 114 from a supplementary server 290, which may be located separately from the server 120. After the server 120 has executed a single program of the programs 111, 112, 113, 114 the server may delete the single program from the memory 123. As a result, the programs 111, 112, 113, 114 may not be hosted permanently on the server 120.

In one embodiment, the first and third computer system 100, 140 may load the programs 111, 112, 113, 114 from the supplementary server 290 into the first and second function memory 115, 155, respectively, if the first party or second party starts the virtual account service via opening the mobile application on the first or third computer system 100, 140. By that, a required space of the storage 107, 147 of the first or third computer system 100, 140 may be reduced. Furthermore, this example may reduce a required space of the memory 123. In addition to that, the virtual account service may load the programs 111, 112, 113, 114 quicker from the memories 103, 143 into the memory 123 than from the supplementary server 290 into the memory 123.

The front end 280 may comprise a module which may enable the parties to enter data which may be used for registering for the virtual account service, hereinafter referred to as registration module 281, for setting up the joint deal, hereinafter referred to as set-up module 282, for getting subscribed to the joint deal, hereinafter referred to as subscription module 283 and/or which may enable the virtual account service to publish the joint deal within the virtual account service, hereinafter referred to as publishing module 285.

Each module 281, 282, 283, 285 may communicate with the server 120 via a single API. For example, the registration module 281, the set-up module 282, the subscription module 283, and the publishing module 285 may communicate with the server 120 via a registration-API 261, a set-up-API 262, a subscription-API 263, and a publishing-API 265, respectively.

As each party may communicate via a single front end with the server 120, the APIs 261, 262, 263, 265 may realize these communications by collecting data from each front end and sending the data to the server 120. The API-gateway 260 may schedule these communications. This may help to prevent deadlocks, for example if several parties try to get subscribed by the server 120 simultaneously or if several parties try to set-up the joint deal simultaneously. In the latter example it may be advantageous if the joint deal is set up only once. The API-gateway 260 and the subscription-API 263 together may provide an ordered subscription of the parties according to a point of time when the parties have opened the subscription module 283 in their respective computer system.

The bank account interface 270 may enable the virtual account service to communicate with the bank account of the second party. An application programming interface of a personal bank 264 (personal bank API 264) may send information from the bank account interface 270 to the server 120. The personal bank API 264 may also communicate with the front end 280 and preferably with the subscription module 283 to exchange banking data.

Figure 3:
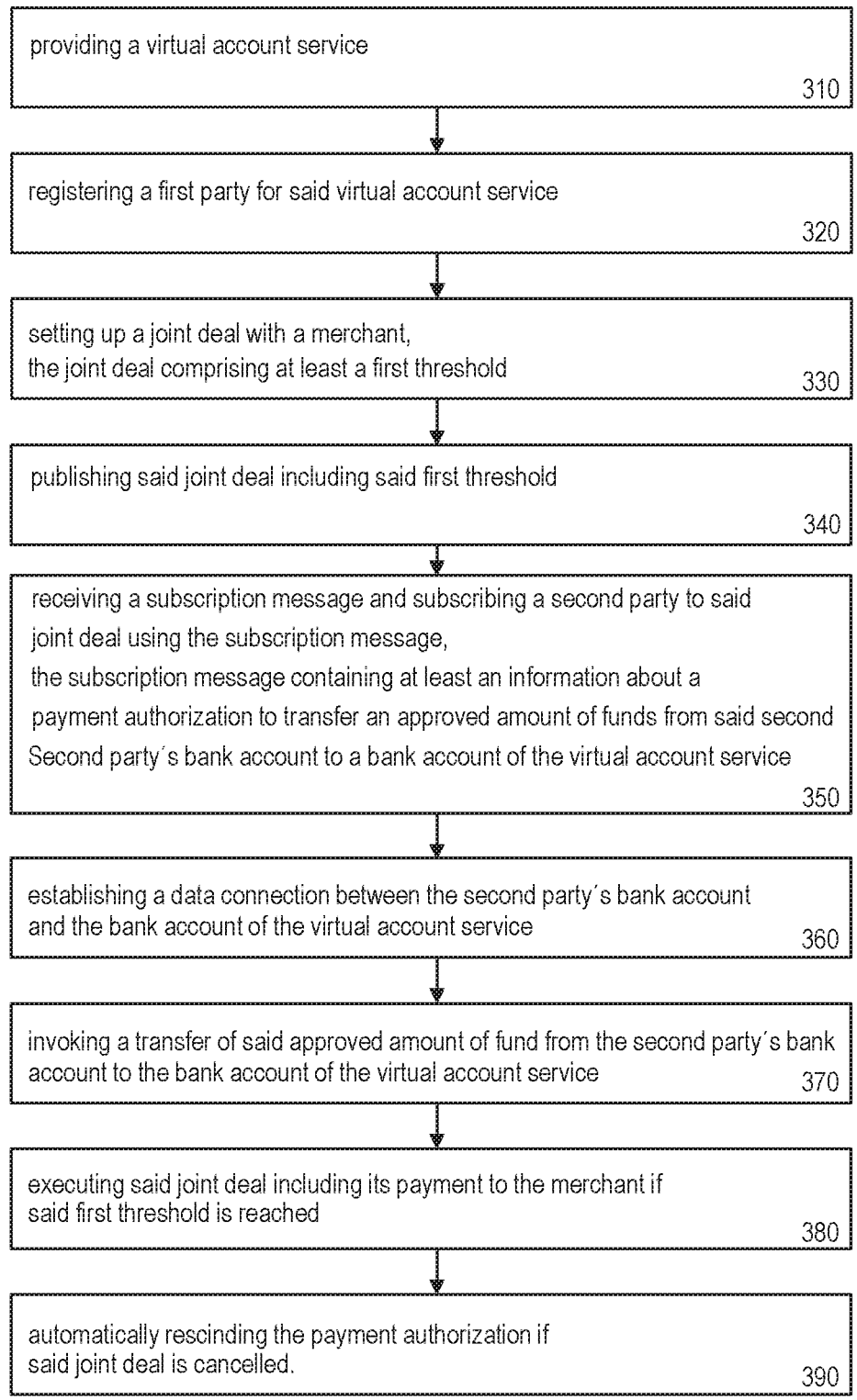
FIG. 3 is an operational flowchart illustrating a process for online group payment according to at least one embodiment.

Referring now to FIG. 3, an operational flowchart illustrating the exemplary process for handling an online group payment using the virtual account service according to at least one embodiment is depicted. The process may include the following steps.

In step 310 the virtual account service is provided. In one embodiment, the virtual account service may be realized by creating a network comprising at least the server 120 and one further computer system such as the first and/or the third computer system 100, 140, wherein the server 120 may be connected to the first and/or the third computer system 100, 140. In another example the virtual account service may be provided by the first, second, third and fourth function.

In step 320 the first party is registered for the virtual account service. For the registration of the first party, the registration module 281 may read in personal details such as name or username, mailing address, and password of the first party. The personal details may be entered by the first party via a display of the first computer system 100.

In step 330 the joint deal with the merchant is set up by using the virtual account service and input data entered by the first party. In one embodiment, the first party may enter the input data by selecting the joint deal as one event from the events 221.1, 221.2, 221.3, 222.1, 222.2, 222.3, 223.1, 223.2, 223.3. The joint deal may contain a first threshold. The first threshold may be specified by the input data.

In one example the first threshold may be a minimum number of parties subscribed to the joint deal. That means that the joint deal may only be executed by the virtual account service if an actual number of parties subscribed to the joint deal is equal or greater than the first threshold. The minimum number of parties subscribed to the joint deal may be a first lower limit of people who at least need to participate in the joint deal in order to get a discount rate. Typically, the first lower limit may be set by the merchant.

In one embodiment, each event may have several further lower limits of people who at least need to participate in the event in order to achieve different discount rates, respectively. The further lower limits may be set by the merchant.

The set-up module 282 may receive the first lower limit and/or the further lower limits including their discount rates from the event database 210 or from the merchant selling system 230. In both cases the server 120 may communicate with the set-up module 282 via the set-up-API 262. The first lower limit and preferably the further lower limits may be displayed on the display of the first computer system 100 by the set-up module 282.

In one embodiment, the first threshold may be specified by a selection of one of the lower limits made by the first party. In another embodiment, the first threshold may be read in from the event database 210 as the only lower limit which may be available to gain a discount for the joint deal. In this case the first threshold may be specified by simply selecting the joint deal.

In another embodiment, the first threshold may be a maximum individual price of the joint deal. The maximum individual price may be the maximum price the first party may be willing to pay for taking part in the joint deal. In this embodiment the joint deal may be executed by the virtual account service only if an individual price to pay for the joint deal is equal or lower than the first threshold. The first threshold may be entered manually by the first party and read in by the set-up module 282. In one embodiment the joint deal may comprise a first threshold and a second threshold, wherein the first threshold may be the minimum number of parties subscribed to the joint deal and the second threshold may be the maximum individual price of the joint deal. Here, the first threshold may be specified according to one of the above-mentioned variants and the second threshold may be entered manually and read in by the set-up module 282.

Step 320 and step 330 may be performed by running the first program 111 on the processor 102 of the first computer system 100 and/or the processor 122 of the server 120. The first program 111 may include the registration module 281 and the set-up module 282. The first program 111 may be loaded from the first function memory 115, the storage 107, or the supplementary server 290 into the memory 123. If the first program 111 runs on the processor 122, an execution of the first program 111 may activate the registration module 281 via the registration-API 261 and the set-up module 282 via the set-up-API 262.

In step 340 the joint deal is published within the virtual account service. For example, the server 120 may send details about the joint deal, such as the first threshold, the event category, the actions, and the dates, via the publishing-API 265 to the publishing module 285. The publishing module 285 may display the details of the joint deal on the display of the first and/or third computer system 100, 140.

In step 350 the server 120 receives the subscription message. Furthermore, the server 120 may subscribe the second party to the joint deal using the subscription message. The personal bank API 264 may send the subscription message from the bank account interface 270 to the server 120.

The subscription message contains at least an information about a payment authorization to transfer an approved amount of funds from the second party's bank account to a bank account of the virtual account service. In one example the payment authorization may be in the form of a credit card authorization or any other form of payment authorization which requires an additional action by the virtual account service in order to eventually receive the approved amount of funds, hereinafter referred to as payment authorization with supplemental action.

The payment authorization with supplemental action may enable the virtual account service to initiate a transfer of the approved amount of funds, i.e., an approved amount of money, from the second party's bank account to the bank account of the virtual account service as long as the payment authorization with supplemental action is valid. Typically credit card authorizations expire after a couple of weeks. The approved amount of funds may be transferred from the second party's bank account to the bank account of the virtual account service if the virtual account service converts the payment authorization with supplemental action by performing the supplemental action. The supplemental action may be sending a message including the information about the payment authorization to the personal bank or to a credit card payment service.

In another example the payment authorization may be a direct order to transfer the approved funds from the second party's bank account to the bank account of the virtual account service. The direct order may be given by the second party via an interface of the second party's bank or via a direct online payment service. In this example the approved amount of funds may be sent to the bank account of the virtual account service without any supplemental action by the virtual account service.

The information about the payment authorization may at least contain an information that the payment authorization is valid. The term "subscription message" as used herein refers to any type of message containing an information that the payment authorization to transfer the approved amount of funds from the second party's bank account to the bank account of the virtual account service has been given and is valid at the moment the subscription message is created. Any receiver within the computer system 10 receiving the subscription message may have an information about the fact that the second party has given a binding agreement for the transfer of the approved amount of funds.

The step 350 may be performed by running the second program 112 on the processor 122 of the server 120. The second program 112 may be loaded from the first or second function memory 115, 155 or the storage 107, 147 or the supplementary server 290. If the processor 122 executes the second program 112 the subscription module 283 may be activated via the subscription-API 263. An activation of the subscription module 283 may enable the second party to enter the banking data and by that to create the payment authorization.

The publishing module 285 may display the actual number of parties who are already subscribed to the joint deal on the display of the first or third computer system 100, 140. In addition to that, the publishing module 285 may display names or further personal details of the subscribed parties.

In step 360 a data connection between the second party's bank account and the bank account of the virtual account service is established. To establish the data connection the virtual account service may communicate with the bank account interface 270 which may be connected to the second party's bank account and with the payment gateway 250 which may be connected to the bank account of the virtual account service.

In step 370 the server 120 invokes a transfer of the approved amount of funds from the second party's bank account to the bank account of the virtual account service via the data connection. In step 370 the server 120 may convert the payment authorization given by the second party which may be regarded as a partial payment of the second party. Similarly, the server 120 may convert further payment authorizations given by further parties subscribed to the joint deal in order to realize further partial payments of the further parties.

In step 380 the joint deal is executed including the payment to the merchant if the first threshold is reached. In order to check whether the first threshold is reached the processor 122 may run the third program 113. The payment to the merchant comprises transferring an amount of money equal to the total price of the joint deal to the bank account of the merchant. In step 380 the server may communicate with an interface of a bank or payment service associated with the merchant. Furthermore, the latter interface may communicate with the merchant selling system 230 and the server 120 to confirm the payment to the merchant.

The steps 360, 370, 380 may be performed by running the fourth program 114 on the processor 122 of the server 120. The third and the fourth program 113, 114 may be loaded from the storage 107, the first or second function memory 115, 155 or the supplementary server 290.

In step 390 the payment authorization is rescinded automatically if the joint deal is canceled. A cancelation of the joint deal may be performed by the merchant. The virtual account service may detect if the merchant increases the total price of the joint deal or reduces the discount rate for the joint deal, e.g., the merchant cancels the joint deal. The actualization module 231 may send data about such changes of the joint deal to the server 120. Alternatively, or additionally the virtual account service may cancel the joint deal if the virtual account service detects that one or more payment authorizations given by other parties than the second party are invalid. The other parties may comprise the first party and the further parties. The term "rescind the payment authorization" as used herein may in one case refer to any action which transforms the payment authorization with supplemental action in an unusable, i.e., invalid, state.

In another case, e.g., the payment authorization is the direct payment order and the approved amount of funds has been already transferred to the bank account of the virtual account service, the term "rescinding the payment authorization" refers to transferring the approved amount of funds back to the second party's bank account.

The joint deal may also be canceled if a further condition may not be fulfilled in an actual instant of time, wherein the further condition may be set up by the second party or by the first party or one of the further parties. The further condition may be set up during registration. For example, a total individual price for all subscribed events may be entered by the second party. The further condition may be, that a sum of an individual price of the joint deal and a further maximum individual price of a further deal the second party or one of the further parties are subscribed to may be below or equal to the total individual price. According to one embodiment, the joint deal may only be executed if the first threshold is reached and the further condition is fulfilled.

All actions performed to realize the cancelation may be invoked by the cancelation engine 240. For example, the cancelation engine 240 may communicate with the bank account interface 270 in order to rescind the payment authorization with supplemental action or to initiate the transfer of the approved amount of funds.

During the steps 310 to 390 virtual account service may store details of an action of the virtual account service in an encrypted database, e.g., in the digital archive 220 which may be encrypted. Alternatively, or in addition, the encrypted database may be stored on the storage 107 of the first computer system 100 and on the storage 127 of the second computer system 120. The encrypted database may contain details of all actions which are performed by the virtual account service within a time span starting from an instant of time when the joint deal is set up and ending at an actual instant of time. As a result, a network of encrypted storages may be built being similar to a blockchain.

Figure 4:
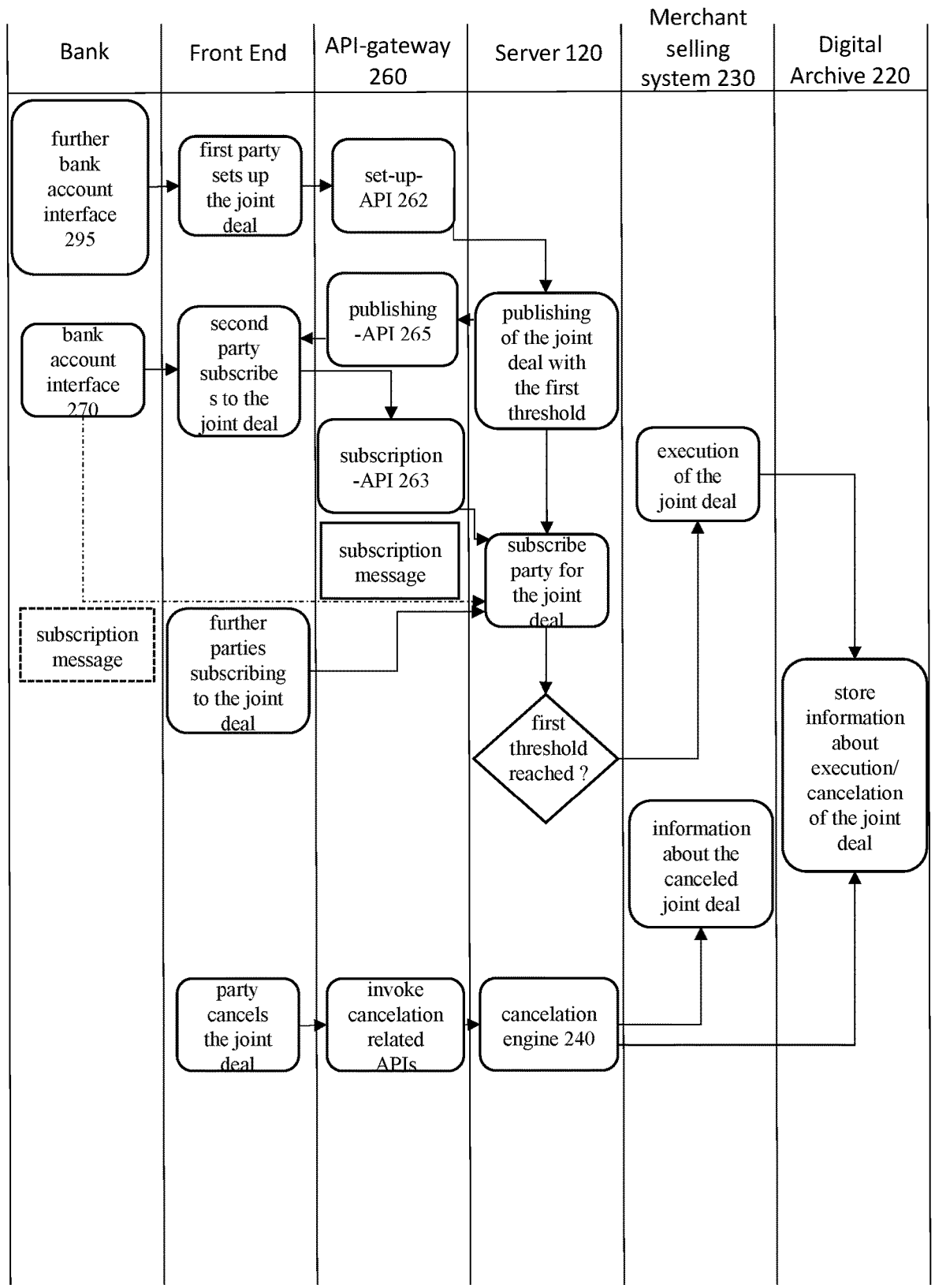
FIG. 4 is flowchart illustrating an exemplary online group payment process between the components depicted in FIG. 2 according to at least one embodiment.

Referring to FIG. 4, an operational flowchart illustrating an exemplary group payment process implemented by the virtual account service is depicted. FIG. 4 illustrates interactions between the bank account interface 270, the front end 280, the API-gateway 260, the server 120, and the merchant selling system 230 using by the virtual account service. In FIG. 4, the first party may already be registered according to step 320. The first party may set up the joint deal and may get subscribed to the joint deal by interacting with the set-up module 282 and the subscription module 283 via the display of the first computer system 100.

After the first party has set up the joint deal, the set-up module 282 may send an event information message to the server 120 via the set-up-API 262. This may invoke the publishing of the joint deal including the first threshold. A flow of information referring to the subscription of the first party is not shown in FIG. 4 for the sake of brevity. Accordingly, only the flow of information from the further bank account interface 295 to the front end 280 is shown.

The second party may get subscribed to the joint deal by interacting with the subscription module 283 via the display of the third computer system 140. The bank account interface 270 may be connected to the subscription module 283 via the personal bank API 264 and the subscription-API 263 such that the second party may reserve money for a partial payment of the joint deal. As a result, the second party may create the payment authorization.

After the payment authorization has been created, the personal bank API 264 may send a message of approval to the subscription module 283. Alternatively, the personal bank API 264 may send the message of approval to the server 120 which is shown in dashed lines. In the former case, the subscription module 283 may convert the message of approval into the subscription message and send the subscription message to the server 120 via the subscription-API 263. In the latter case, the message of approval may be the subscription message. As long as the joint deal is published within the virtual account service, new parties may get subscribed to the joint deal by the server 120. An upfront registration may be a requirement for any party who may get subscribed. By creating a payment authorization, the party agrees, at least to the minimum number of subscribed parties for executing the joint deal or the maximum individual price to pay for the joint deal.

The virtual account service may check frequently if the first threshold is reached. In one embodiment, if the first threshold is the minimum number of parties subscribed to the joint deal, the virtual account service may check frequently if the actual number of subscribed parties is equal or higher than the first threshold. In one embodiment, if the first or second threshold is the maximum individual price of the joint deal, the virtual account service may check frequently if the individual price of the joint deal is equal or below the maximum individual price of the joint deal. The individual price may change according to the actual number of parties subscribed to the joint deal. If the first threshold is reached, the virtual account service may execute the joint deal if the joint deal only includes the first threshold. If the first threshold and the second threshold are reached, the virtual account service may execute the joint deal if the joint deal includes the first threshold and the second threshold.

The execution of the joint deal may be invoked automatically by the virtual account service as described above or manually by the first or the second party by using an interface, e.g., touching a release button on the display of the first or third computer system 100, 140. The virtual account service may assign a right to execute the joint deal manually to the first party by default. The virtual account service may provide an option to transfer the right to execute the joint deal to the second party. This option may be available for the first party as long as the joint deal is not executed.

In one embodiment, during the execution of the joint deal, it may not be possible to get subscribed to or resign from the joint deal. If one of the payment authorizations is invalid, the virtual account service may cancel the joint deal as mentioned above or may reopen the joint deal for new potential parties for getting subscribed by the server 120. If the joint deal is canceled, the virtual account service may rescind all payment authorizations given by all parties subscribed to the joint deal. The virtual account service may invoke this immediately after the cancelation. In addition, all subscribed parties may be released from the group.

After the execution of the joint deal, the virtual account service may store information about the execution of the joint deal in the digital archive 220.

If one of the parties cancels the joint deal, the virtual account service may activate the cancelation engine via a cancelation-API. The cancelation engine may rescind the payment authorization as mentioned above and may send information about a cancelation of the joint deal to the merchant selling system 230. Furthermore, the cancelation engine 240 may send information about the cancelation and a data history of the joint deal from an instant of time when it was set up to a point of time when it was canceled to the digital archive 220.

It may be appreciated that FIGS. 2 to 4 provide only an illustration of one embodiment and does not imply any limitations with regard to how different embodiments may be implemented. Many modifications to the depicted embodiment(s) may be made based on design and implementation requirements.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimum management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
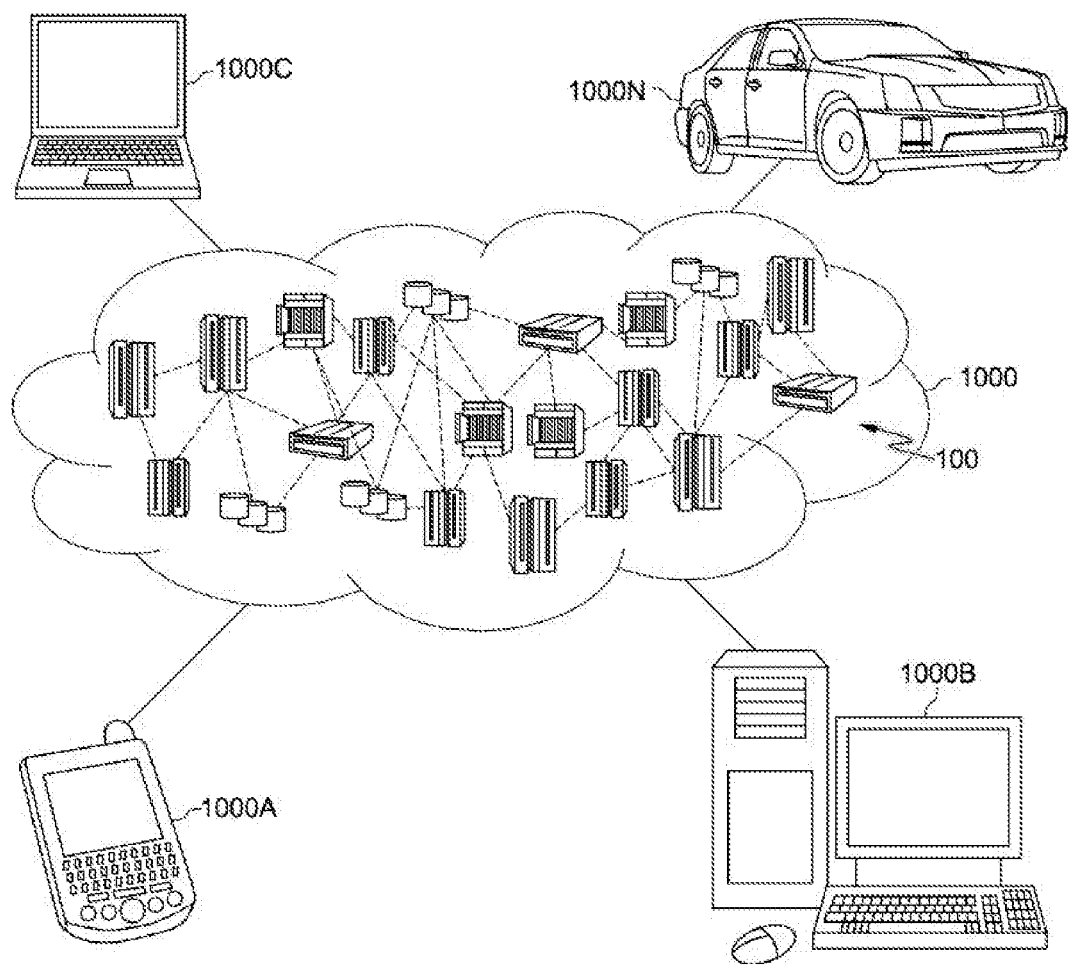
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
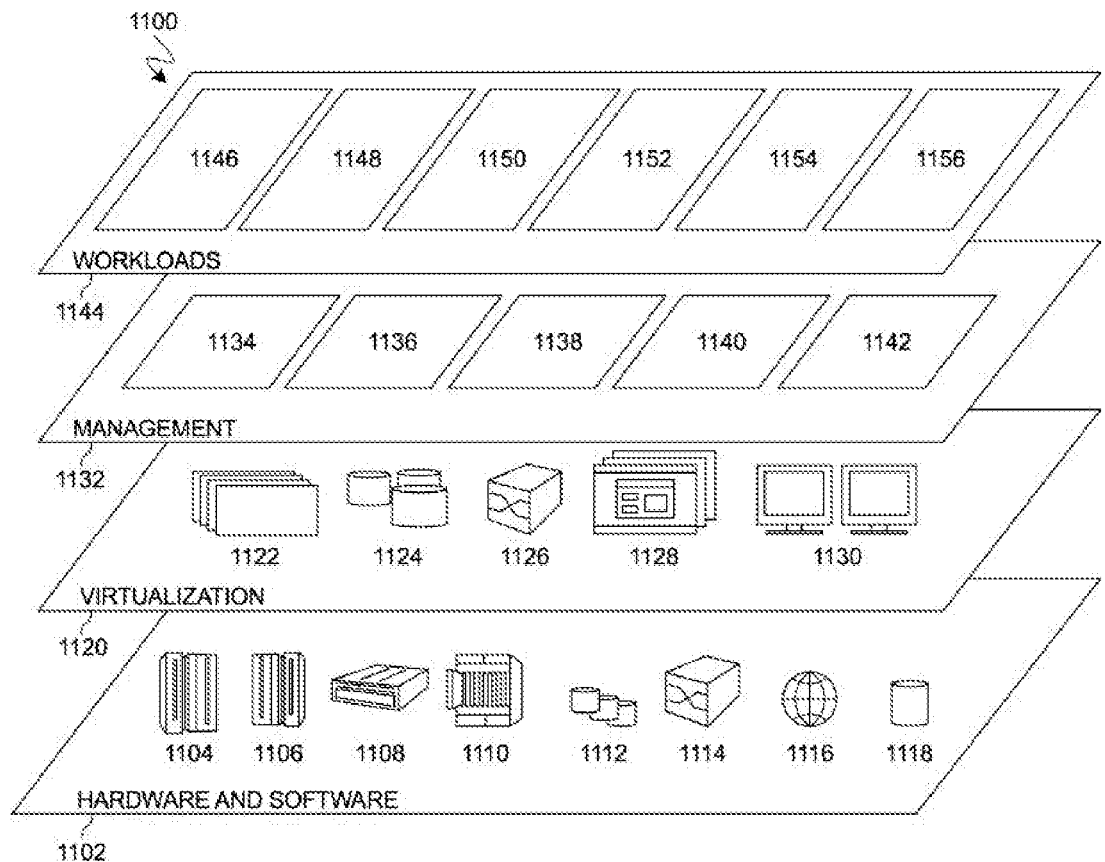
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and virtual account service 1156. A virtual account service provides a way to coordinate execution of a joint deal and prevent a risk that a first party that sets up the joint deal pays a total price of the joint deal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    registering a first party using a virtual account service, wherein the virtual account service includes a virtual account service bank account;
    initiating, using the virtual account service and input data received from the registered first party, a joint deal with a merchant, wherein the initiated joint deal includes at least one first threshold;
    subscribing, using the virtual account service, the first party to the initiated joint deal in response to receiving a first subscription message from the first party associated with the joint deal, wherein the first subscription message includes a first payment authorization to transfer a first approved fund from a first party bank account to the virtual account service bank account;
    publishing the initiated joint deal including the at least one first threshold for executing the published initiated join deal within the virtual account service;
    subscribing, using the virtual account service, a second party to the published initiated joint deal in response to receiving a second subscription message from the second party associated with the published initiated joint deal, wherein the second subscription message includes a second payment authorization to transfer a second approved fund from a second party bank account to the virtual account service bank account, wherein the subscribed second party is independently added to the published initiated joint deal without the subscribed first party adding the subscribed second party to the published initiated joint deal;
    establishing a data connection between the first party bank account and the virtual account service bank account and the second party bank account and the virtual account service bank account;
    invoking, using the established data connection, a simultaneous transfer of the first approved fund from the first party bank account and the second approved fund from the second party bank account to the virtual account service bank account prior to execution of the published initiated joint deal;

determining whether the at least one first threshold is met;
in response to determining that the at least one first threshold is met, executing the published initiated joint deal, wherein the executing of the published initiated joint deal includes, receiving, using an interface of the virtual account service, an execution release command and executing a merchant payment associated with the published initiated joint deal;
determining whether a cancelation condition of the published initiated join deal is detected, wherein the cancelation condition is selected from the group consisting of an invalid payment authorization, a party cancelation, a merchant cancelation, and an unfulfilled further condition; and
in response to determining that the cancelation condition of the published initiated joint deal is detected, automatically rescinding the first payment authorization from the first party and the second payment authorization from the second party.

2. The method of claim 1, further comprising:
automatically executing the merchant payment associated with the published initiated joint deal in response to meeting the at least one first threshold.

3. The method of claim 1, wherein the at least one first threshold includes a minimum number of parties subscribed to the published initiated joint deal.

4. The method of claim 1, wherein the at least one first threshold includes a maximum individual party price for the published initiated joint deal.

5. The method of claim 1, wherein the published initiated joint deal further comprises a second threshold, wherein the at least one first threshold includes a minimum number of parties subscribed to the published initiated joint deal and the second threshold includes a maximum individual party price for the published initiated joint deal, wherein the published initiated joint deal is executed if the at least one first threshold and the second threshold are reached.

6. The method of claim 1, further comprising:
receiving, using the virtual account service, a further condition from the subscribed second party; and
executing the published initiated joint deal in response to meeting the at least one first threshold and fulfilling the received further condition from the subscribed second party.

7. The method of claim 1, further comprising:
storing, using the virtual account service, at least one data corresponding to the published initiated joint deal in an encrypted database.

8. The method of claim 1, further comprising:
storing, using the virtual account service, at least one data corresponding to the published initiated joint deal in a first storage device of the first party and a second storage device of the second party.

9. A computer system for an online group payment, comprising:
one or more processors, one or more computer readable memories, one or more non-transitory computer readable tangible storage media, and program instructions stored on at least one of the one or more non-transitory computer readable tangible storage media for execution by at least one of the one or more processors via at least one of the one or more computer readable memories, wherein the computer system is capable of performing a method comprising:
registering a first party using a virtual account service, wherein the virtual account service includes a virtual account service bank account;
initiating, using the virtual account service and input data received from the registered first party, a joint deal with a merchant, wherein the initiated joint deal includes at least one first threshold;
subscribing, using the virtual account service, the first party to the initiated joint deal in response to receiving a first subscription message from the first party associated with the joint deal, wherein the first subscription message includes a first payment authorization to transfer a first approved fund from a first party bank account to the virtual account service bank account;
publishing the initiated joint deal including the at least one first threshold for executing the published initiated join deal within the virtual account service;
subscribing, using the virtual account service, a second party to the published initiated joint deal in response to receiving a second subscription message from the second party associated with the published initiated joint deal, wherein the second subscription message includes a second payment authorization to transfer a second approved fund from a second party bank account to the virtual account service bank account, wherein the subscribed second party is independently added to the published initiated joint deal without the subscribed first party adding the subscribed second party to the published initiated joint deal;
establishing a data connection between the first party bank account and the virtual account service bank account and the second party bank account and the virtual account service bank account;
invoking, using the established data connection, a simultaneous transfer of the first approved fund from the first party bank account and the second approved fund from the second party bank account to the virtual account service bank account prior to execution of the published initiated joint deal;
determining whether the at least one first threshold is met;
in response to determining that the at least one first threshold is met, executing the published initiated joint deal, wherein the executing of the published initiated joint deal includes, receiving, using an interface of the virtual account service, an execution release command and executing a merchant payment associated with the published initiated joint deal;
determining whether a cancelation condition of the published initiated join deal is detected, wherein the cancelation condition is selected from the group consisting of an invalid payment authorization, a party cancelation, a merchant cancelation, and an unfulfilled further condition; and
in response to determining that the cancelation condition of the published initiated joint deal is detected, automatically rescinding the first payment authorization from the first party and the second payment authorization from the second party.

10. The computer system of claim 9, further comprising:
automatically executing the merchant payment associated with the published initiated joint deal in response to meeting the at least one first threshold.

11. The computer system of claim 9, wherein the at least one first threshold includes a minimum number of parties subscribed to the published initiated joint deal.

12. The computer system of claim 9, wherein the at least one first threshold includes a maximum individual party price for the published initiated joint deal.

13. The computer system of claim 9, wherein the published initiated joint deal further comprises a second threshold, wherein the at least one first threshold includes a minimum number of parties subscribed to the published initiated joint deal and the second threshold includes a maximum individual party price for the published initiated joint deal, wherein the published initiated joint deal is executed if the at least one first threshold and the second threshold are reached.

14. The computer system of claim 9, further comprising:
receiving, using the virtual account service, a further condition from the subscribed second party; and
executing the published initiated joint deal in response to meeting the at least one first threshold and fulfilling the received further condition from the subscribed second party.

15. The computer system of claim 9, further comprising:
storing, using the virtual account service, at least one data corresponding to the published initiated joint deal in an encrypted database.

16. A computer program product for an online group payment, comprising:
one or more computer readable tangible storage media and program instructions stored on at least one of the one or more computer readable tangible storage media, the program instructions executable by a processor to cause the processor to perform a method comprising:
registering a first party using a virtual account service, wherein the virtual account service includes a virtual account service bank account;
initiating, using the virtual account service and input data received from the registered first party, a joint deal with a merchant, wherein the initiated joint deal includes at least one first threshold;
subscribing, using the virtual account service, the first party to the initiated joint deal in response to receiving a first subscription message from the first party associated with the joint deal, wherein the first subscription message includes a first payment authorization to transfer a first approved fund from a first party bank account to the virtual account service bank account;
publishing the initiated joint deal including the at least one first threshold for executing the published initiated join deal within the virtual account service;
subscribing, using the virtual account service, a second party to the published initiated joint deal in response to receiving a second subscription message from the second party associated with the published initiated joint deal, wherein the second subscription message includes a second payment authorization to transfer a second approved fund from a second party bank account to the virtual account service bank account, wherein the subscribed second party is independently added to the published initiated joint deal without the subscribed first party adding the subscribed second party to the published initiated joint deal;
establishing a data connection between the first party bank account and the virtual account service bank account and the second party bank account and the virtual account service bank account;
invoking, using the established data connection, a simultaneous transfer of the first approved fund from the first party bank account and the second approved fund from the second party bank account to the virtual account service bank account prior to execution of the published initiated joint deal;
determining whether the at least one first threshold is met;
in response to determining that the at least one first threshold is met, executing the published initiated joint deal, wherein the executing of the published initiated joint deal includes, receiving, using an interface of the virtual account service, an execution release command and executing a merchant payment associated with the published initiated joint deal;
determining whether a cancelation condition of the published initiated join deal is detected, wherein the cancelation condition is selected from the group consisting of an invalid payment authorization, a party cancelation, a merchant cancelation, and an unfulfilled further condition; and
in response to determining that the cancelation condition of the published initiated joint deal is detected, automatically rescinding the first payment authorization from the first party and the second payment authorization from the second party.

* * * * *